(12) United States Patent
Kakish

(10) Patent No.: US 8,180,945 B2
(45) Date of Patent: May 15, 2012

(54) USB ADD-ON MODULE

(75) Inventor: Musa Ibrahim Kakish, Anaheim, CA (US)

(73) Assignee: I/O Interconnect Limited, Santa Ana, CA (US)

(*) Notice: Subject to any disclaimer, the term of this patent is extended or adjusted under 35 U.S.C. 154(b) by 269 days.

(21) Appl. No.: 12/655,487

(22) Filed: Jan. 4, 2010

(65) Prior Publication Data

US 2011/0066784 A1  Mar. 17, 2011

Related U.S. Application Data

(60) Provisional application No. 61/241,686, filed on Sep. 11, 2009.

(51) Int. Cl.
*G06F 13/00* (2006.01)

(52) U.S. Cl. .......................... 710/300; 710/313; 710/314

(58) Field of Classification Search .......... 710/300–317, 710/1–2, 8–19, 52–64
See application file for complete search history.

(56) References Cited

U.S. PATENT DOCUMENTS

| | | | | |
|---|---|---|---|---|
| 6,618,788 B1* | 9/2003 | Jacobs | | 710/315 |
| 6,907,492 B2* | 6/2005 | Matsuda et al. | | 710/313 |
| 7,058,748 B1* | 6/2006 | Jacobs et al. | | 710/311 |
| 7,124,215 B2* | 10/2006 | Lelong et al. | | 710/62 |
| 7,177,973 B2* | 2/2007 | Jackson | | 710/313 |
| 7,269,022 B2* | 9/2007 | Yen | | 361/737 |
| 7,471,512 B1* | 12/2008 | Strickland | | 361/679.41 |
| 7,493,431 B2 | 2/2009 | McLeod | | |
| 7,818,486 B2* | 10/2010 | McLeod | | 710/313 |
| 7,849,251 B2* | 12/2010 | Diefenbaugh | | 710/313 |
| 8,005,999 B1* | 8/2011 | Felton et al. | | 710/16 |
| 2005/0278472 A1* | 12/2005 | Gierke | | 710/313 |
| 2006/0064521 A1* | 3/2006 | Lin | | 710/60 |
| 2007/0294460 A1 | 12/2007 | Huang | | |
| 2009/0104813 A1 | 4/2009 | Chen et al. | | |
| 2010/0169511 A1* | 7/2010 | Dunstan et al. | | 710/16 |

\* cited by examiner

*Primary Examiner* — Raymond Phan

(57) ABSTRACT

An adaptive USB extender is installed in a computer and includes a USB host controller mounted on a computer motherboard, a USB receptacle mounted on an I/O board, a USB cable interconnecting the I/O board and the USB host controller for transmitting USB-compliant signals, and an active signal driver mounted on the I/O board and connected between the USB receptacle and the USB cable for amplifying and buffering the USB-compliant signals, thereby maintaining the signal integrity of the USB-compliant signals.

6 Claims, 6 Drawing Sheets

USB ADD-ON MODULE

CROSS-REFERENCE TO RELATED APPLICATIONS

This application takes priority from and claims the benefit of Provisional Application Ser. No. 61/241,686 filed on Sep. 11, 2009, the contents of which are hereby incorporated by reference.

BACKGROUND OF THE INVENTION

1. Field of the Invention

The present invention relates to an internal Universal Serial Bus (hereinafter "USB") interface, and more particularly to an adaptive USB extender, wherein the USB extender is disposed to be mounted within a computer.

2. Description of the Prior Art

The advent of USB3.0 standard provides an ultra-high speed data transmission speed at 5 GHz, which can transfer data 10 times faster than the legacy USB 2.0 standard. In designing the USB3.0 subsystem, it is desirable to allow an integrated USB3.0 Extensible Host Controller Interface (hereinafter "xHCI") controller to be proximate to the USB3.0 receptacle which can be reached by the user in an easy manner. This places a major challenge to maintain the signal integrity for this ultra-speed data transmission protocol.

Currently, the implementation for integrating a USB3.0 xHCI host controller in a computing machine is achieved by designing the 3.0 xHCI host controller at the motherboard level along with the USB3.0 receptacle, and introducing an add-on xHCI host card which is plugged into the Peripheral Component Interconnect Express (hereinafter "PCIe") slots where the USB3.0 receptacle is physically placed and routed on the same printed circuit board (hereinafter "PCB"), and the xHCI controller is placed as well with minimal routing distance between the receptacle and its drivers.

Although the above implementation is the best way to maintain the signal integrity, but in real life it is utopian due to the mechanical constraints using such approach and the ability to place the USB3.0 receptacle in a convenient location for the user. First of all, USB3.0 signal is a very high speed signal with a data transmission rate at 5 GHz, and the 5 GHz data transmission signal is very hard to maintain the signal integrity if there is a signal discontinuity between the driver and the receiver. Therefore, the best mode to maintain signal integrity is to allow the USB3.0 receptacle to be close to the xHCI host controller chip and route the signal traces on the same medium, for example, printed circuit board.

To increase the flexibility of locating the USB3.0 receptacle in a computer, a USB extender is devised. An alternative configuration for the USB extender according to the prior art is shown in FIG. 1. FIG. 1 shows the configuration of a conventional USB extender 100. In FIG. 1, a USB3.0 receptacle 102 is located far away from a USB3.0 xHCI host controller 106 and is connected to the USB3.0 xHCI host controller 106 through a passive USB cable assembly 104. The xHCI host controller 106 is mounted on a PCIe interface 108 installed in a computing machine (not shown).

The present invention aims to introduce a way to maintain the signal integrity during the signal transmission along the USB cable assembly while preserving the flexibility of locating the USB3.0 receptacle in a computer.

SUMMARY OF THE INVENTION

It is therefore a primary objective of the invention to provide an adaptive USB extender to keep the signal integrity of USB-compliant signals intact during cable transmission.

To this end, the present invention provides an adaptive USB extender including a USB host controller mounted on a computer motherboard, a USB receptacle mounted on an input/output (hereinafter "I/O") board, a USB cable interconnecting the I/O board and the USB host controller for transmitting USB-compliant signals, and a signal driver mounted on the I/O board and connected between the USB receptacle and the USB cable for amplifying and buffering the USB-compliant signals so as to maintain the signal integrity of the USB-compliant signals.

In accordance with the present invention, the USB host controller is a USB3.0 xHCI host controller and the USB receptacle is a USB3.0 receptacle.

In accordance with the present invention, the signal driver is an active signal driver, for example, a current mode logic (hereinafter "CML") driver.

Another aspect of the present invention is related to a method for maintaining a signal integrity of a USB-compliant signal transmitted along a USB cable assembly, including the steps of: (1) sending a USB-compliant signal from a USB host controller; (2) transmitting the USB-compliant signal through a USB cable assembly; (3) re-driving the USB-compliant signal through a signal driver by amplifying and buffering a received USB-compliant signal to recondition and renew the signal integrity of the received USB-compliant signal, thereby generating a re-driven USB-compliant signal; and (4) receiving the re-driven USB-compliant signal by a USB receptacle.

These and other objectives of the present invention will no doubt become obvious to those of ordinary skill in the art after reading the following detailed description of the preferred embodiment, which is illustrated in the various figures and drawings.

There has thus been outlined, rather broadly, the more important features of the USB extender in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

DETAILED DESCRIPTION OF THE PREFERRED EMBODIMENT

In the following detailed description of the preferred embodiment design, an active signal driver for USB3.0 standard is employed and mounted adjacent to a USB3.0 receptacle. The active signal driver is mounted on the same I/O board with the USB3.0 receptacle, and the I/O board is connected to a USB3.0 xHCI host controller with a USB3.0 cable assembly. The active signal driver is configured to amplify and buffer USB3.0 compliant signals while also cleaning, reconditioning and renewing signal integrity. In this way, the signal integrity of the USB3.0 compliant signals can be maintained during cable transmission.

Figure 1:
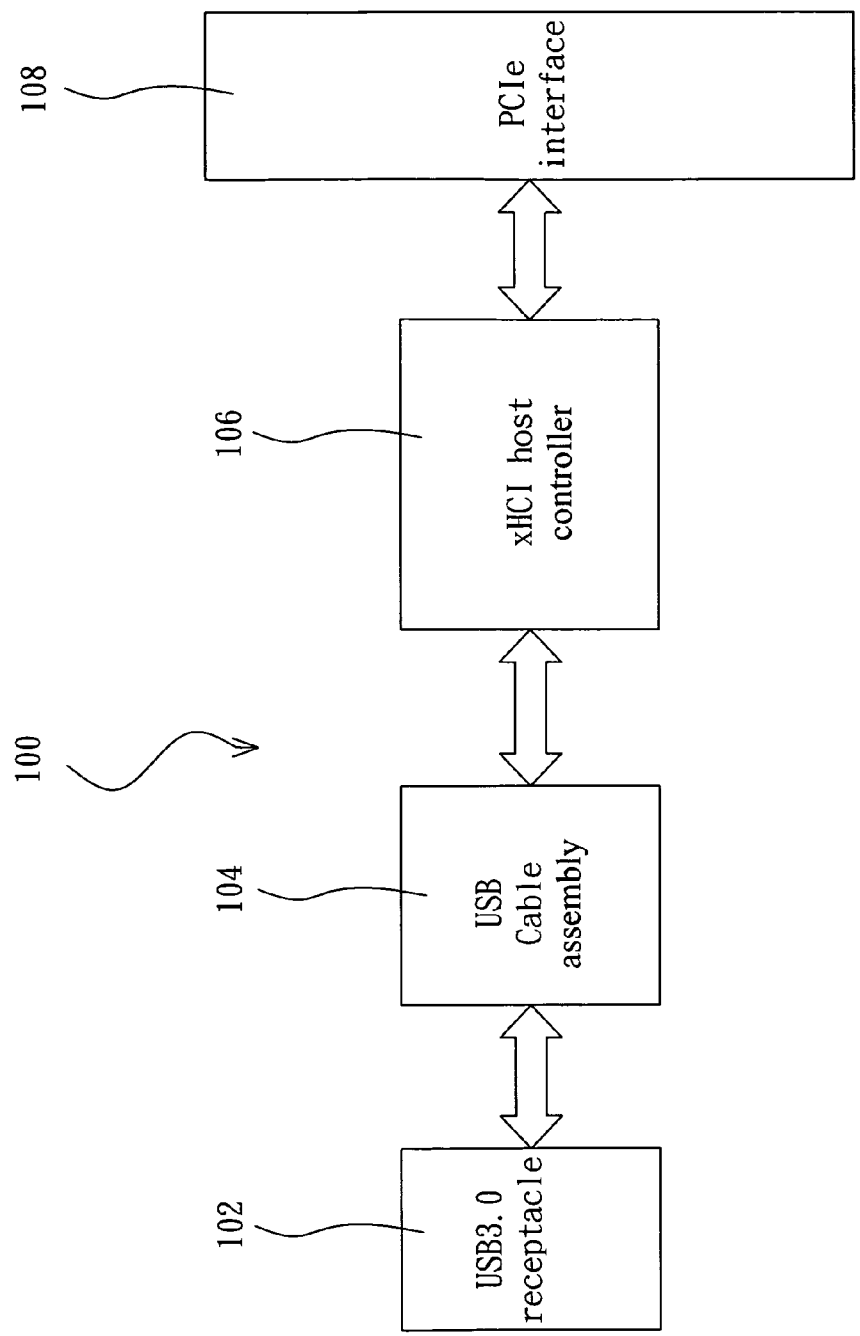
FIG. 1 is a plain view showing the USB extender according to the prior art.
Figure 2:
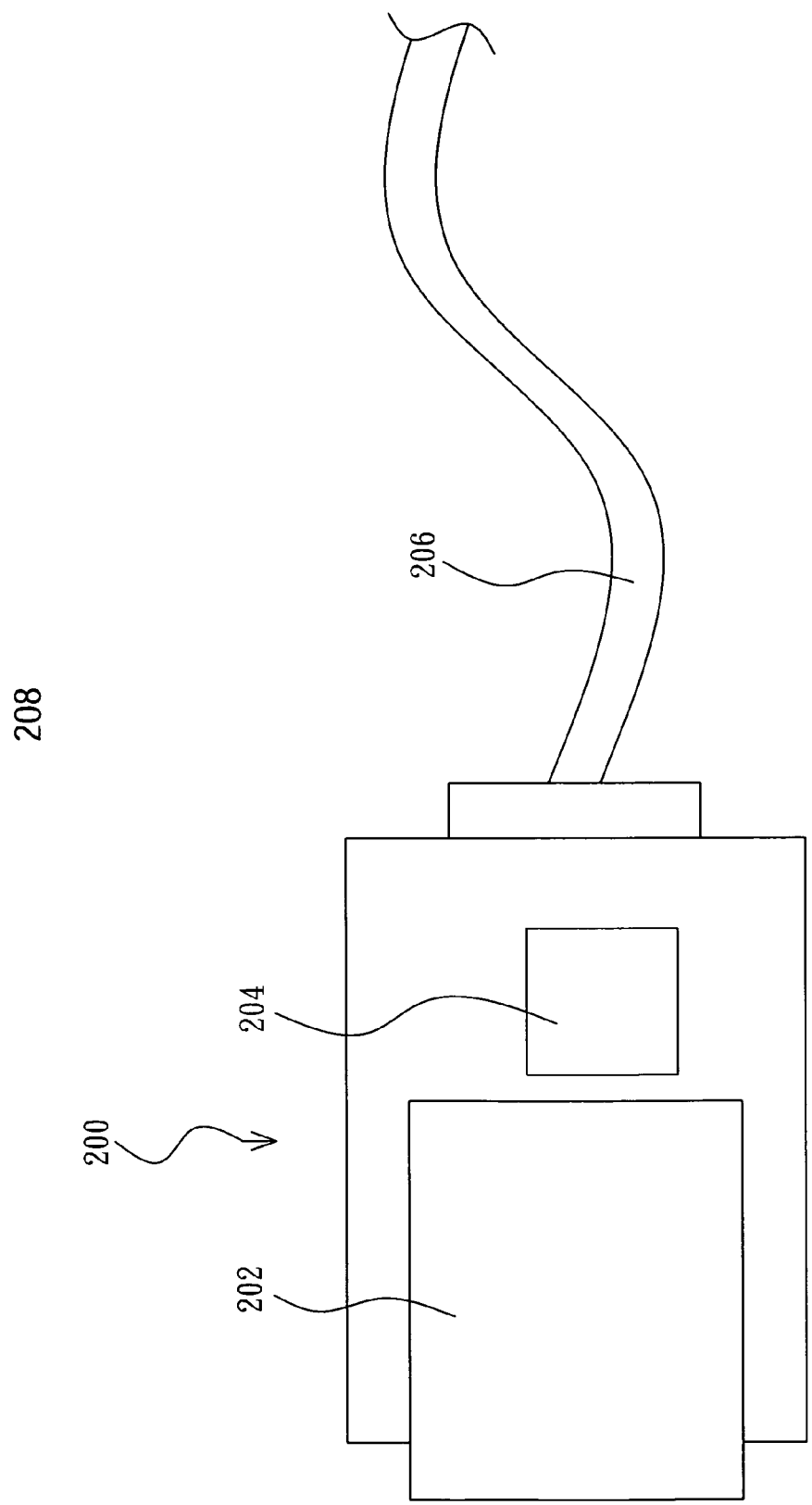
FIG. 2 is a plain view showing the partial configuration of the USB extender according to a preferred embodiment of the present invention.
Figure 3:
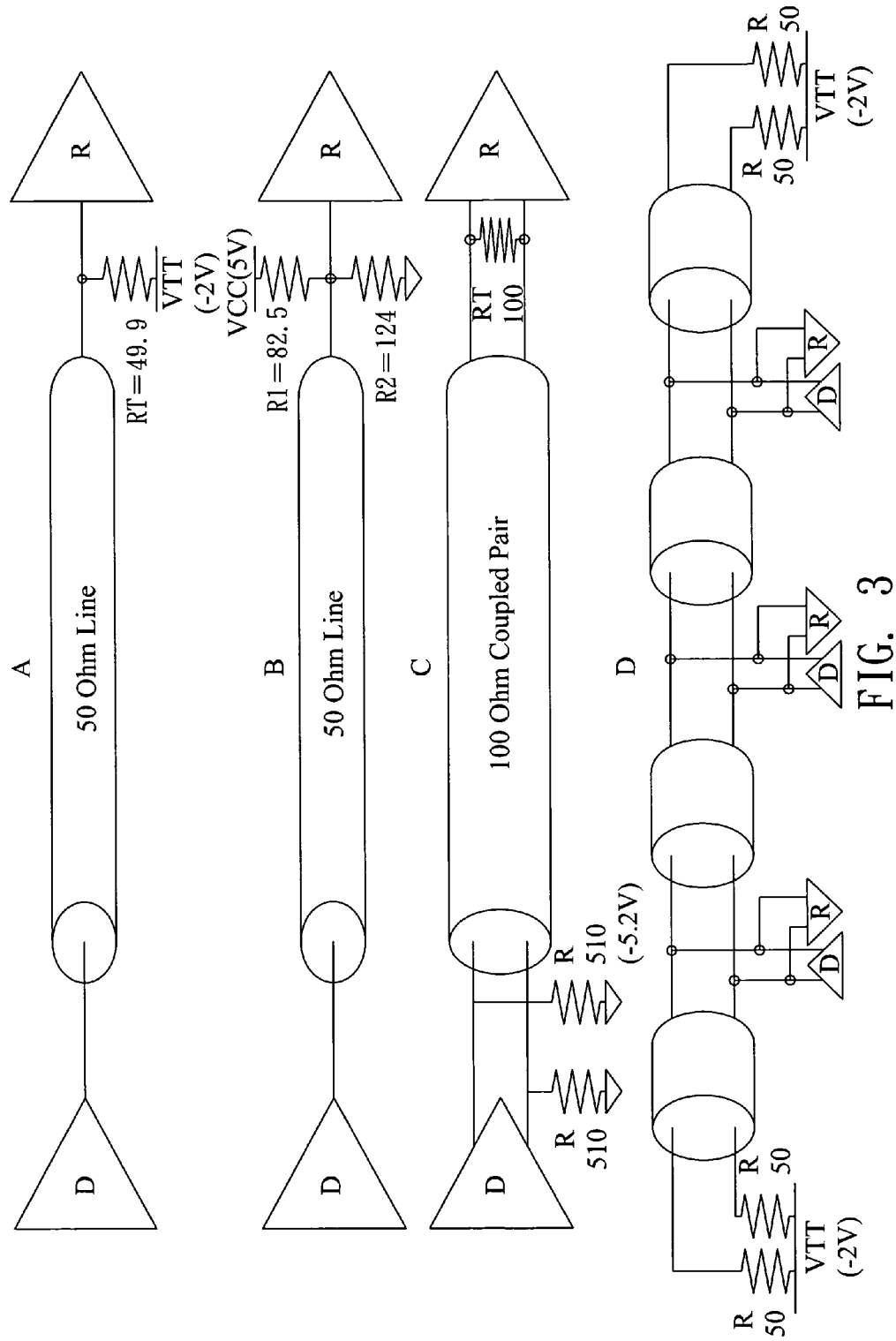
FIG. 3 is a plain view showing the active signal driver according to a preferred embodiment of the present invention.

FIG. 2 is a plain view partially showing an adaptive USB extender according to a preferred embodiment of the invention. In FIG. 2, the adaptive USB extender 208 includes a USB3.0 connector 202, an active signal driver 204, and a USB3.0 signal cable assembly 206. The active signal driver 204 and the USB3.0 connector 202 are mounted on an I/O board 200, and the active signal driver 204 is located on the same board with the USB3.0 connector 202. The cable assembly 206 is connected between the I/O board 200 and a USB3.0 xHCI host controller (not shown). The active signal driver 204 is configured to re-drive the USB3.0 compliant signals by amplifying and buffering the USB3.0 compliant signals transmitted along the cable assembly 206 while cleaning, reconditioning and renewing the signal integrity of the USB3.0 compliant signals. The configuration of the active signal driver 204, for example, a current mode logic (CML) driver, is depicted in FIG. 3. As to the operation of the active signal driver 204, it is not intended to give details herein.

Figure 4:
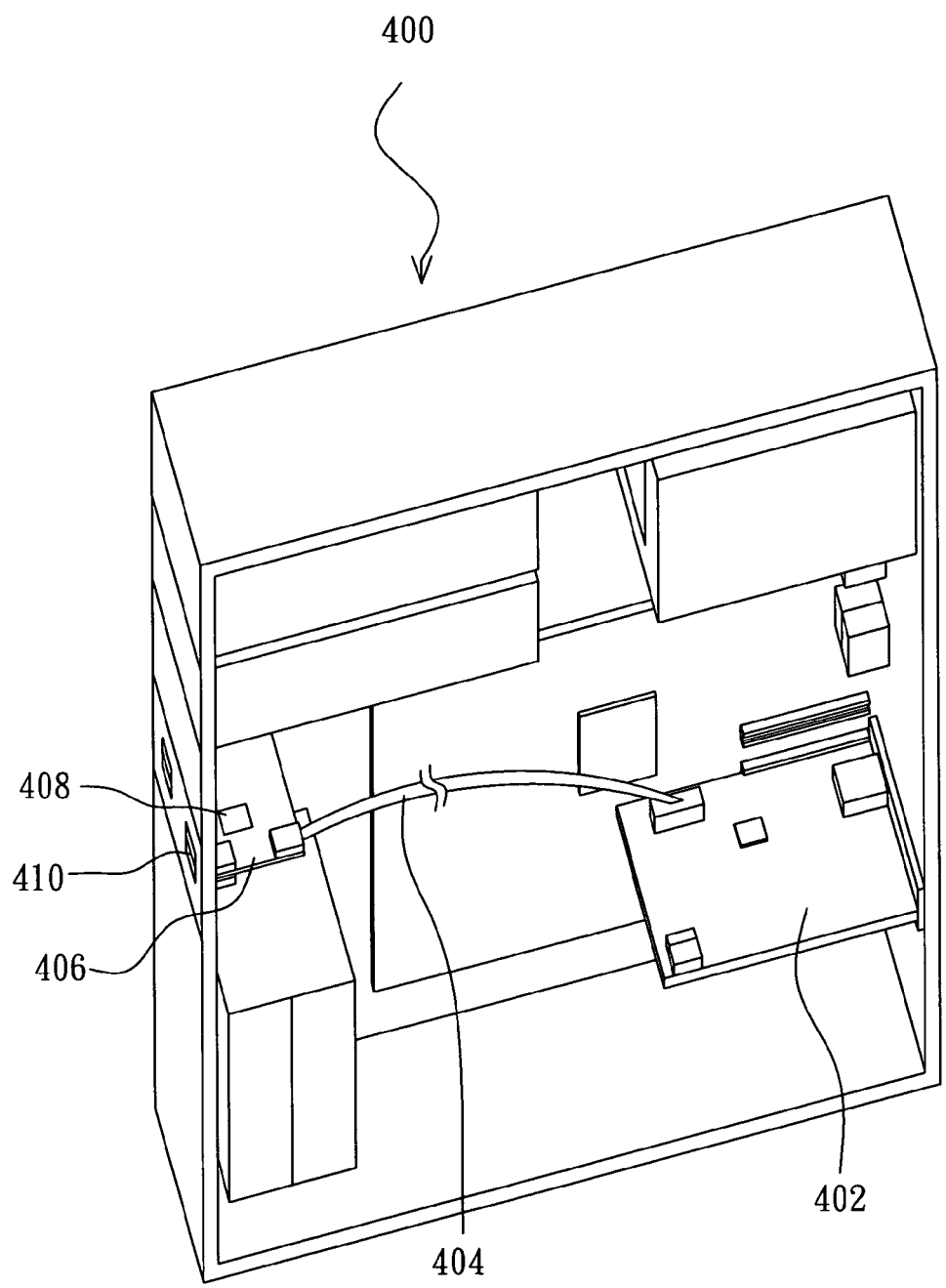
FIG. 4 is a plain view showing the entire configuration of the USB extender according to a first exemplary embodiment of the present invention.

FIG. 4 is a plain view showing an adaptive USB extender module 400 implemented in a desktop computer in its entirety according to a first exemplary embodiment of the invention. In FIG. 4, a USB3.0 xHCI host controller 402 is implemented in a PCIe host card, and the xHCI-PCIe host card 402 is connected to the I/O board 406 holding the active signal driver 408 and the USB3.0 receptacle 410 through an internal USB cable assembly 404.

Figure 5:
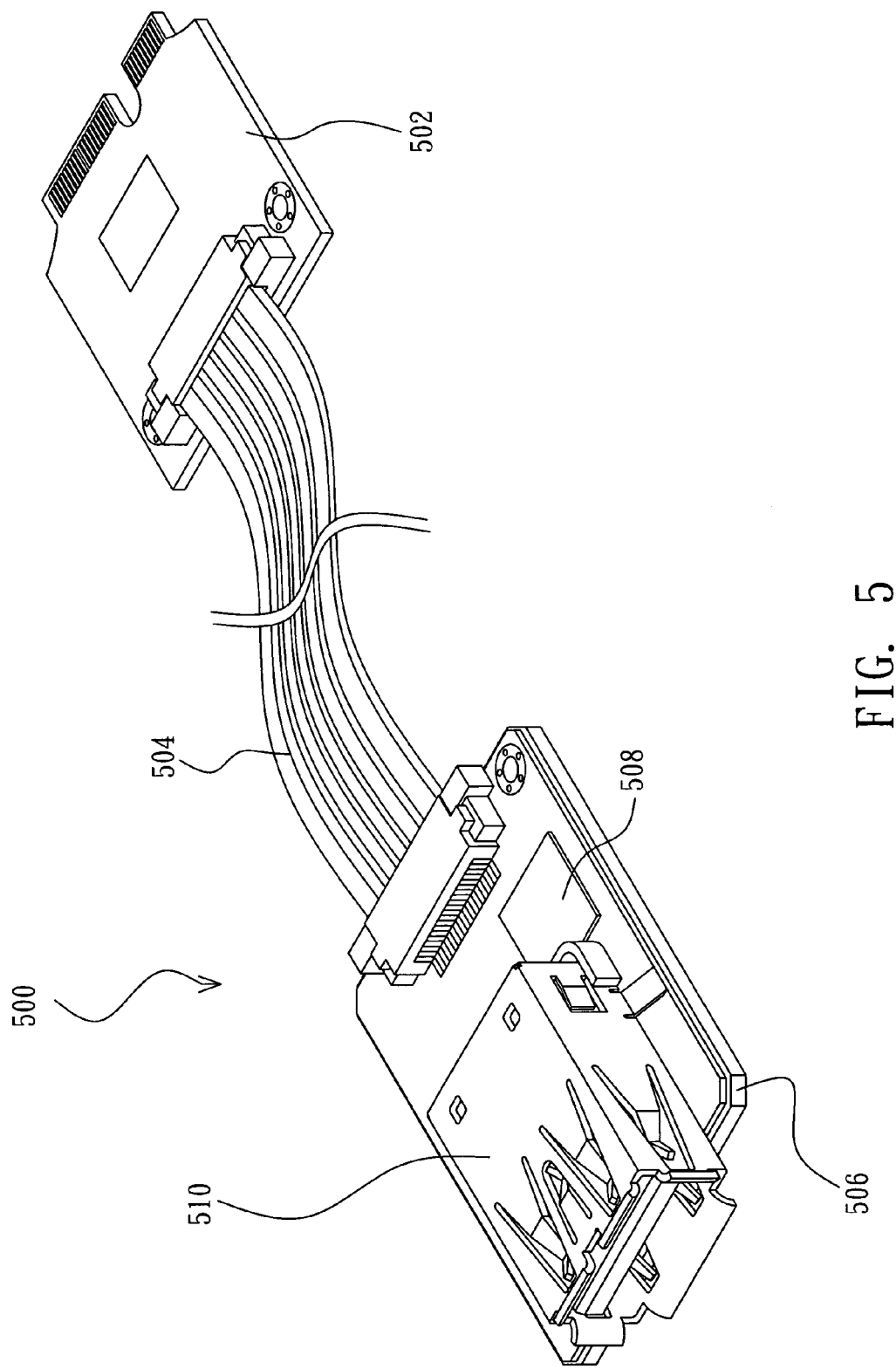
FIG. 5 is a plain view showing the entire configuration of the USB extender according to a second exemplary embodiment of the present invention.

FIG. 5 is a plain view showing an adaptive USB extender module 500 implemented in a portable computer in its entirety according to a second exemplary embodiment of the invention. In FIG. 5, a USB3.0 xHCI host controller 502 is implemented in a miniPCIe form factor. In FIG. 5, the miniPCIe xHCI host controller 502 is connected to the I/O board 506 holding an active signal driver 508 and the USB3.0 receptacle 510 through an internal USB cable assembly 504.

Figure 6:
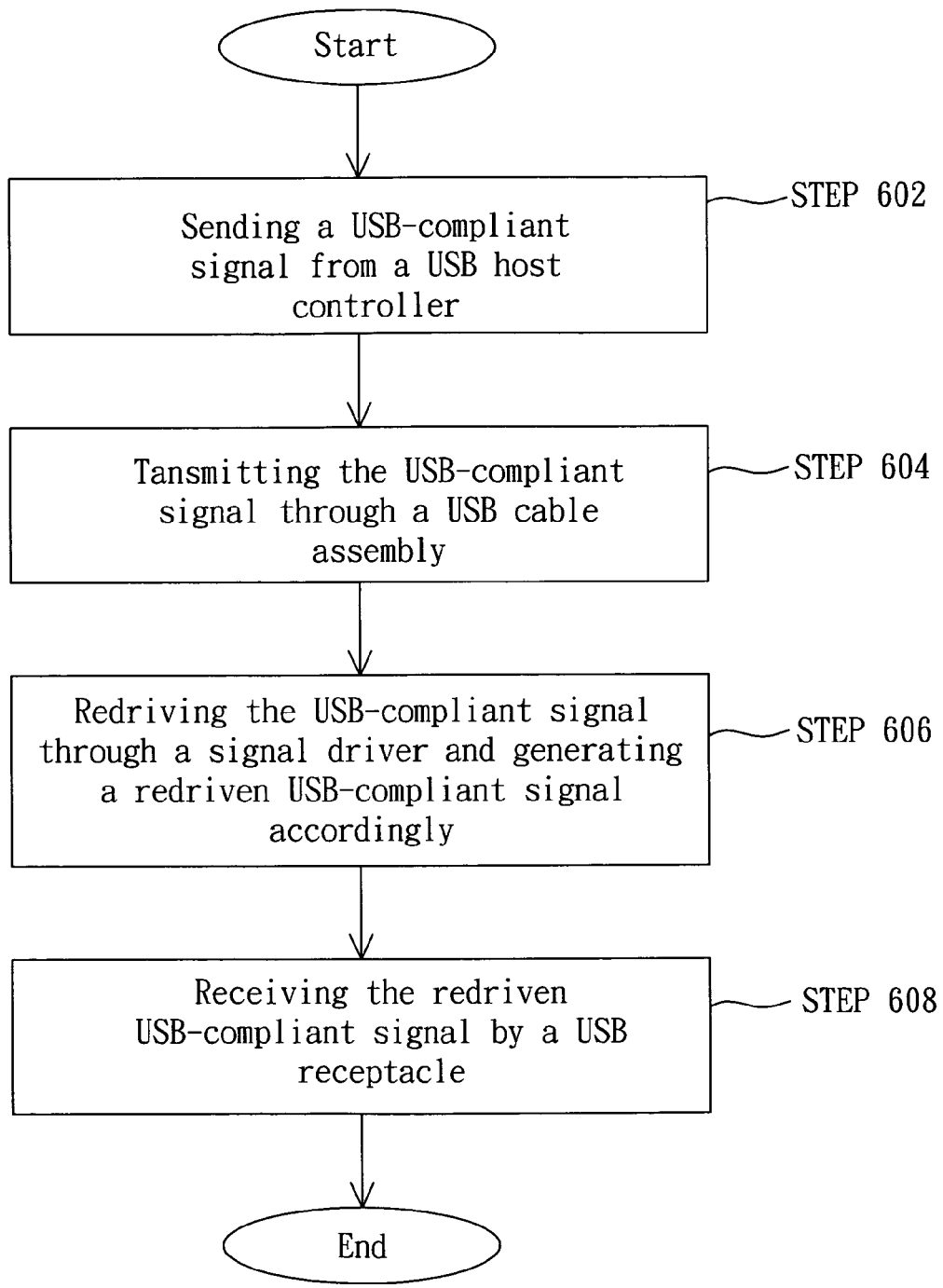
FIG. 6 is a flow chart depicting the steps of maintaining the signal integrity of USB-compliant signals according to the present invention.

FIG. 6 illustrates the steps of maintaining the signal integrity of USB-compliant signals according to the invention. In the beginning, a USB-compliant signal is sent by a USB host controller at step 602. Next, the USB-compliant signal is transmitted through a USB cable assembly at step 604. Next, the USB-compliant signal is re-driven through a signal driver by amplifying and buffering a received USB-compliant signal to recondition and renew the signal integrity of the received USB-compliant signal, thereby generating a re-driven USB-compliant signal, as indicated at step 606. Finally, the re-driven USB-compliant signal is received by a USB receptacle at step 608.

In summary, the invention devises a method and system for extending the flexibility of locating USB3.0 port in a computer. The invention is characterized by re-conditioning the USB3.0 compliant signal right at the USB3.0 receptacle mounted on the I/O panel of the computing machine. The reconditioning to the USB3.0 signal will be adaptive and active, i.e. USB3.0 compliant signal will be re-driven and the signal level and termination parameters will adjust in an automated manner to resolve any internal cable length or type used to extend the USB3.0 port to any location on the computing machine.

The instant invention is not intended to be restricted to the details of the above described embodiments. It is understood that the embodiments described herein are merely illustrative of the instant invention. Variations in the applications and implementation of the auto-function port may be contemplated by one of ordinary skill in the art without limiting the intended scope of the instant invention disclosed herein and as defined by the following claims.

What is claimed is:

1. A universal serial bus (USB) add-on module for being internally mounted in a computer having a motherboard, comprising:
   a universal serial bus host controller for operatively connecting the motherboard;
   an input/output board;
   a universal serial bus receptacle mounted on the input/output board;
   a universal serial bus cable interconnecting the input/output board and the universal serial bus host controller for transmitting universal serial bus-compliant signals; and
   a signal driver mounted on the input/output board and connected between the universal serial bus receptacle and the universal serial bus cable for amplifying and buffering the universal serial bus-compliant signals, thereby maintaining the signal integrity of the universal serial bus-compliant signals.

2. The universal serial bus add-on module according to claim 1 wherein the universal serial bus host controller is a USB3.0 extensible host controller interface controller and the universal serial bus receptacle is a USB3.0 receptacle.

3. The universal serial bus add-on module according to claim 1 wherein the signal driver is an active signal driver.

4. The universal serial bus add-on module according to claim 2 wherein the USB3.0 extensible host controller interface controller is implemented in a peripheral component interconnect express host card when the computer is a desktop computer.

5. The universal serial bus add-on module according to claim 2 wherein the USB3.0 extensible host controller interface controller is implemented in a mini peripheral component interconnect express host card when the computer is a portable computer.

6. The universal serial bus add-on module according to claim 3 wherein the active signal driver is a current mode logic driver.

* * * * *